United States Patent
Wang et al.

(10) Patent No.: US 9,653,760 B2
(45) Date of Patent: May 16, 2017

(54) BATTERY PACK

(71) Applicant: SAMSUNG SDI CO., LTD., Yongin-si, Gyeonggi-do (KR)

(72) Inventors: Han-Jun Wang, Yongin-si (KR); Dae-Yon Moon, Yongin-si (KR); Hee-Youn Won, Yongin-si (KR)

(73) Assignee: Samsung SDI Co., Ltd., Yongin-Si, Gyeonggi-do (KR)

(*) Notice: Subject to any disclaimer, the term of this patent is extended or adjusted under 35 U.S.C. 154(b) by 39 days.

(21) Appl. No.: 15/015,218

(22) Filed: Feb. 4, 2016

(65) Prior Publication Data

US 2016/0156072 A1 Jun. 2, 2016

Related U.S. Application Data

(63) Continuation of application No. 14/451,958, filed on Aug. 5, 2014, now Pat. No. 9,257,691.

(30) Foreign Application Priority Data

Feb. 11, 2014 (KR) .................. 10-2014-0015641

(51) Int. Cl.
*H01M 10/42* (2006.01)
*H01M 2/10* (2006.01)
(Continued)

(52) U.S. Cl.
CPC ........... *H01M 10/425* (2013.01); *H01M 2/10* (2013.01); *H01M 2/1016* (2013.01);
(Continued)

(58) Field of Classification Search
CPC ............. H01M 10/425; H01M 2/1061; H01M 2220/30; H01M 2/1022; H01M 2/202;
(Continued)

(56) References Cited

U.S. PATENT DOCUMENTS 4,061,955 A * 12/1977 Thomas ................ H02J 7/0026
320/122
4,738,906 A * 4/1988 Sanders .............. H01M 10/625
180/68.5
(Continued)

FOREIGN PATENT DOCUMENTS

EP  2 109 166 A1  10/2009
JP  11-135088 A   5/1999
(Continued)

OTHER PUBLICATIONS

Kouta, Secondary Battery Pack, English Translation, JP11-135088, May 21, 1999.*

(Continued)

*Primary Examiner* — Lucas J. O'Donnell
(74) *Attorney, Agent, or Firm* — Lee & Morse, P.C.

(57) ABSTRACT

A battery pack includes a plurality of battery units, a protective circuit module on each of the plurality of battery units and that is electrically connected to each of the plurality of battery units, and an upper cover on the protective circuit module. Each of the battery units includes a bare cell including a can, an electrode assembly in the can, and a cap plate that seals an opening of the can, and a holder between the bare cell and the protective circuit module. The bare cells are located side by side along a first direction such that each cap plate is exposed along the same direction. One of the holder and the upper cover includes a protrusion that protrudes in a second direction, and another one of the holder and the upper cover includes a hole combined with the protrusion.

20 Claims, 5 Drawing Sheets

(51) Int. Cl.
  *H01M 10/48* (2006.01)
  *H01M 2/20* (2006.01)
(52) U.S. Cl.
  CPC ......... *H01M 2/202* (2013.01); *H01M 10/486* (2013.01); *H01M 2/1061* (2013.01); *H01M 10/42* (2013.01); *H01M 10/4257* (2013.01); *H01M 2010/4271* (2013.01); *H01M 2200/10* (2013.01); *H01M 2220/30* (2013.01)
(58) Field of Classification Search
  CPC .. H01M 2/204; H01M 2/348; H01M 10/0431; H01M 10/0525; H01M 10/4207; H01M 10/443; H01M 10/482; H01M 10/486; H01M 10/5004; H01M 10/5044; H01M 2010/4271; H01M 2200/10; H01M 2/0207; H01M 2/1016; H01M 2/1066; H01M 2/1072; H01M 2/1077; H01M 2/20; H01M 2/22; H01M 2/34; H01M 2/344
  See application file for complete search history.

(56) References Cited

U.S. PATENT DOCUMENTS

| | | | | |
|---|---|---|---|---|
| 4,871,553 A * | 10/1989 | Huhndorff | ............... | H01M 2/34 429/61 |
| 6,403,251 B1 * | 6/2002 | Baggaley | ............ | H01M 2/1016 320/127 |
| 9,515,303 B2 * | 12/2016 | Lee | ............... | H01M 10/425 |
| 2003/0036311 A1 * | 2/2003 | Benson | ............... | G11B 23/505 439/627 |
| 2004/0029000 A1 * | 2/2004 | Morita | ............... | H01M 2/1061 429/162 |
| 2005/0100783 A1 | 5/2005 | Ro et al. | | |
| 2006/0091891 A1 | 5/2006 | Woo et al. | | |
| 2006/0176014 A1 * | 8/2006 | Moon | ............... | H01M 2/1061 320/112 |
| 2008/0102354 A1 * | 5/2008 | Lee | ............... | H01M 10/0431 429/94 |
| 2008/0305367 A1 * | 12/2008 | Baek | ............... | H01M 2/0215 429/7 |
| 2009/0087692 A1 | 4/2009 | Park et al. | | |
| 2009/0123829 A1 * | 5/2009 | Kim | ............... | H01M 2/1022 429/150 |
| 2009/0258285 A1 * | 10/2009 | Kim | ............... | H01M 2/0404 429/97 |
| 2010/0124674 A1 * | 5/2010 | Kwag | ............... | H01M 2/0207 429/7 |
| 2010/0143785 A1 * | 6/2010 | Kwag | ............... | H01M 2/18 429/156 |
| 2010/0143793 A1 | 6/2010 | Yamamoto et al. | | |
| 2010/0178549 A1 | 7/2010 | Moom | | |
| 2010/0209743 A1 | 8/2010 | Koh et al. | | |
| 2011/0086243 A1 * | 4/2011 | Bae | ............... | H01M 2/1022 429/7 |
| 2011/0300433 A1 * | 12/2011 | Kim | ............... | H01M 2/1022 429/159 |
| 2012/0052331 A1 | 3/2012 | Park et al. | | |
| 2012/0214024 A1 * | 8/2012 | Moon | ............... | H01M 2/1061 429/7 |
| 2012/0214025 A1 * | 8/2012 | Moon | ............... | H01M 10/425 429/7 |
| 2012/0214026 A1 | 8/2012 | Moon et al. | | |

FOREIGN PATENT DOCUMENTS

| | | |
|---|---|---|
| JP | 2007-506242 A | 3/2007 |
| JP | 2009-87937 A | 4/2009 |
| JP | 2010-192426 A | 9/2010 |
| JP | 2011-258542 A | 12/2011 |
| JP | 2012-113973 A | 6/2012 |
| KR | 10-2006-0039377 A | 5/2006 |
| KR | 10-2008-0017321 A | 2/2008 |
| KR | 10-2010-0082530 A | 7/2010 |
| KR | 10-2012-0020044 A | 3/2012 |
| KR | 10-2012-0094706 A | 8/2012 |
| KR | 20-0466244 Y1 | 3/2013 |
| WO | WO 2013/187687 A1 | 12/2013 |

OTHER PUBLICATIONS

European Office Action dated Jan. 13, 2015.
Japanese Office Action Dated Nov. 18, 2014.
Korean Registration Determination dated Apr. 30, 2015.
European Office Action dated Jun. 13, 2016.

* cited by examiner

BATTERY PACK

CROSS REFERENCE TO RELATED APPLICATIONS

This is a continuation application based on pending application Ser. No. 14/451,958, filed Aug. 5, 2014, the entire contents of which is hereby incorporated by reference.

Korean Patent Application No. 10-2014-0015641, filed on Feb. 11, 2014, in the Korean Intellectual Property Office, and entitled: "Battery Pack," is incorporated by reference herein in its entirety.

BACKGROUND

1. Field

One or more embodiments relate to a battery pack.

2. Description of the Related Art

Use of portable computers that operate based on internal power supplied from batteries has dramatically increased due to the development of wireless communication technologies such as the Internet. In general, since the portable computers are small and easy to carry, that is, have high mobility, the portable computers are widely used for business or personal purposes in various places. As the portable computers include battery packs, they may be used irrespective of the area of use and connection to land power sources. A battery pack may include a plurality of battery units that may be repeatedly charged/discharged so as to provide sufficient output.

SUMMARY

Embodiments are directed to a battery pack including a plurality of battery units, a protective circuit module on each of the plurality of battery units, the protective circuit module being electrically connected to each of the plurality of battery units, and an upper cover on the protective circuit module. Each of the battery units includes a bare cell including a can having an opening, an electrode assembly in the can, the electrode assembly including a first electrode plate, a second electrode plate, and a separator between the first electrode plate and the second electrode plate, and a cap plate that seals the opening of the can, and a holder between the bare cell and the protective circuit module. The bare cells are located side by side along a first direction such that each cap plate is exposed along the same direction. One of the holder and the upper cover includes a protrusion that protrudes in a second direction, and another one of the holder and the upper cover includes a hole combined with the protrusion.

At least one holder may be on each bare cell.

The holder may be fixed onto the cap plate of the bare cell.

Each of the plurality of battery units may include an electrode pin that protrudes toward the protective circuit module.

The holder may accommodate a temperature-sensing element that is electrically connected to the electrode pin.

The battery pack may further include a lower cover at an opposite side to a side on which the upper cover is disposed, the lower cover facing the upper cover, and a label that is attached to portions of the upper cover and the lower cover and that surrounds sides of each of the battery units.

The battery pack may further include an insulating film between the label and sides of each of the battery units.

A length of the upper cover may be substantially the same as a whole length of the battery units along the first direction.

The upper cover may include a cover opening through which an external terminal formed on the protective circuit module is exposed.

The second direction may be a thickness direction of the battery units. The protrusion may be formed on the holder. The hole may be formed in the upper cover.

Embodiments are also directed to a battery pack including a plurality of battery units, a protective circuit module on a top surface of each of the plurality of battery units, the protective circuit being electrically connected to each of the plurality of the battery units, and an upper cover t on the protective circuit module. Each of the plurality of the battery units may include a bare cell including a top surface having a first polarity, and an electrode pin that has a second polarity that is different from the first polarity, the electrode pin protruding toward the top surface, and a holder under the protective circuit module and on the top surface of the bare cell. The holder of each of the plurality of battery units and the upper cover are combined with each other through an interference fit.

Each holder may include a protrusion. The upper cover may include a hole that is combined with the protrusion through an interference fit.

The protrusion may extend along a thickness direction of each of the battery units.

Each holder may be fixed onto the top surface of the bare cell.

Each holder may accommodate a temperature-sensing element that is electrically connected to the electrode pin.

The battery pack may further include a label that surrounds sides of each of the battery units.

The battery pack may further include a lower cover at an opposite side to a side at which the upper cover is disposed, the lower cover facing the upper cover. Portions of the label may be attached to portions of the upper cover and the lower cover.

The battery pack may include an insulating film between the label and sides of each of the battery units.

The bare cell may further include a can having an opening formed therein, an electrode assembly accommodated in the can through the opening, the electrode assembly including a first electrode plate having a first polarity, a second electrode plate having a second polarity, and a separator between the first and second electrode plates, and a cap plate that seals the opening and forms the top surface. The electrode pin may extend upwardly from the cap plate.

The battery units may be located side by side along a first direction. A length of the upper cover may be substantially the same as an entire length of the battery units along the first direction.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
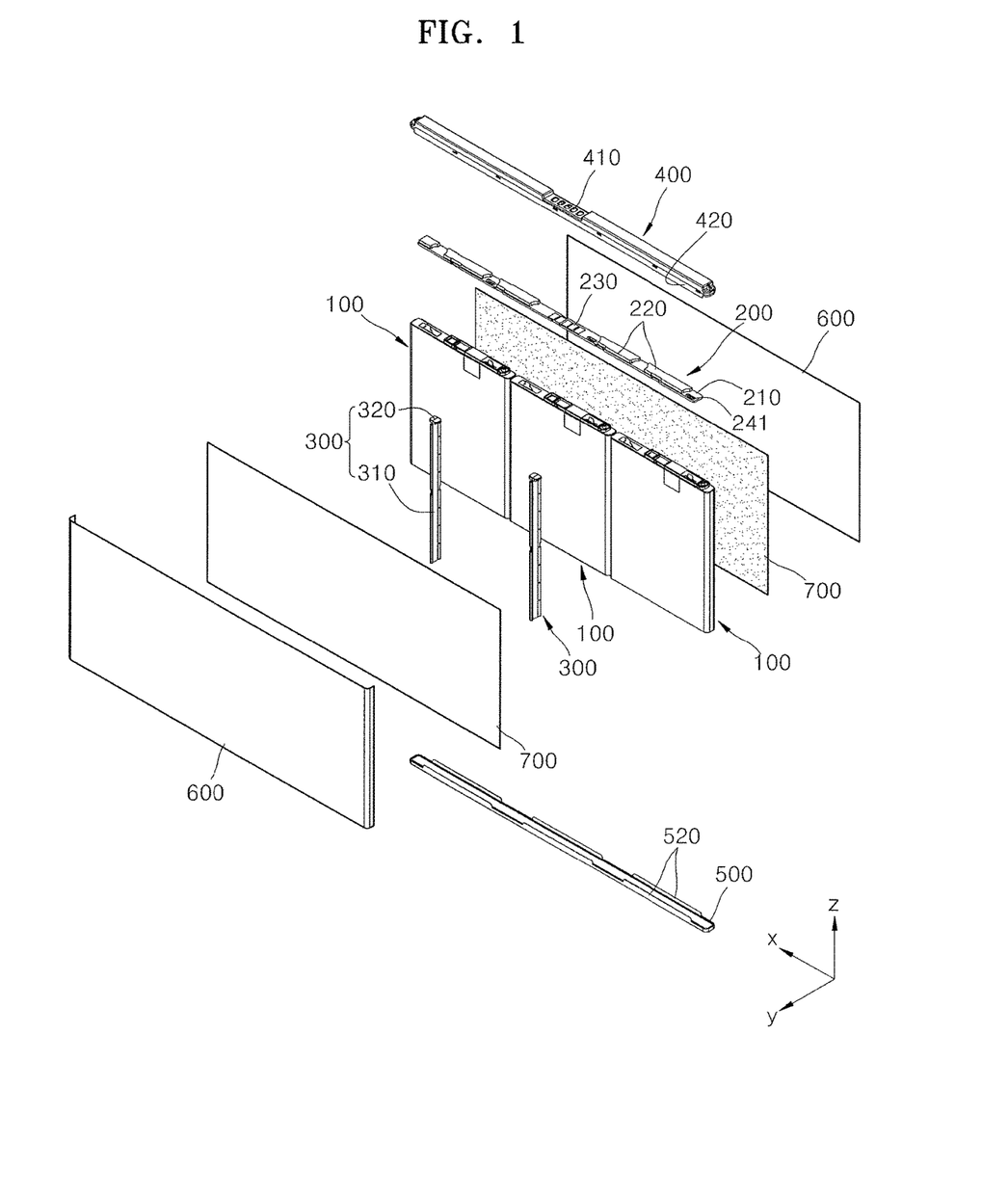
FIG. 1 illustrates a schematic perspective view of a battery pack according to an embodiment.
Figure 2:
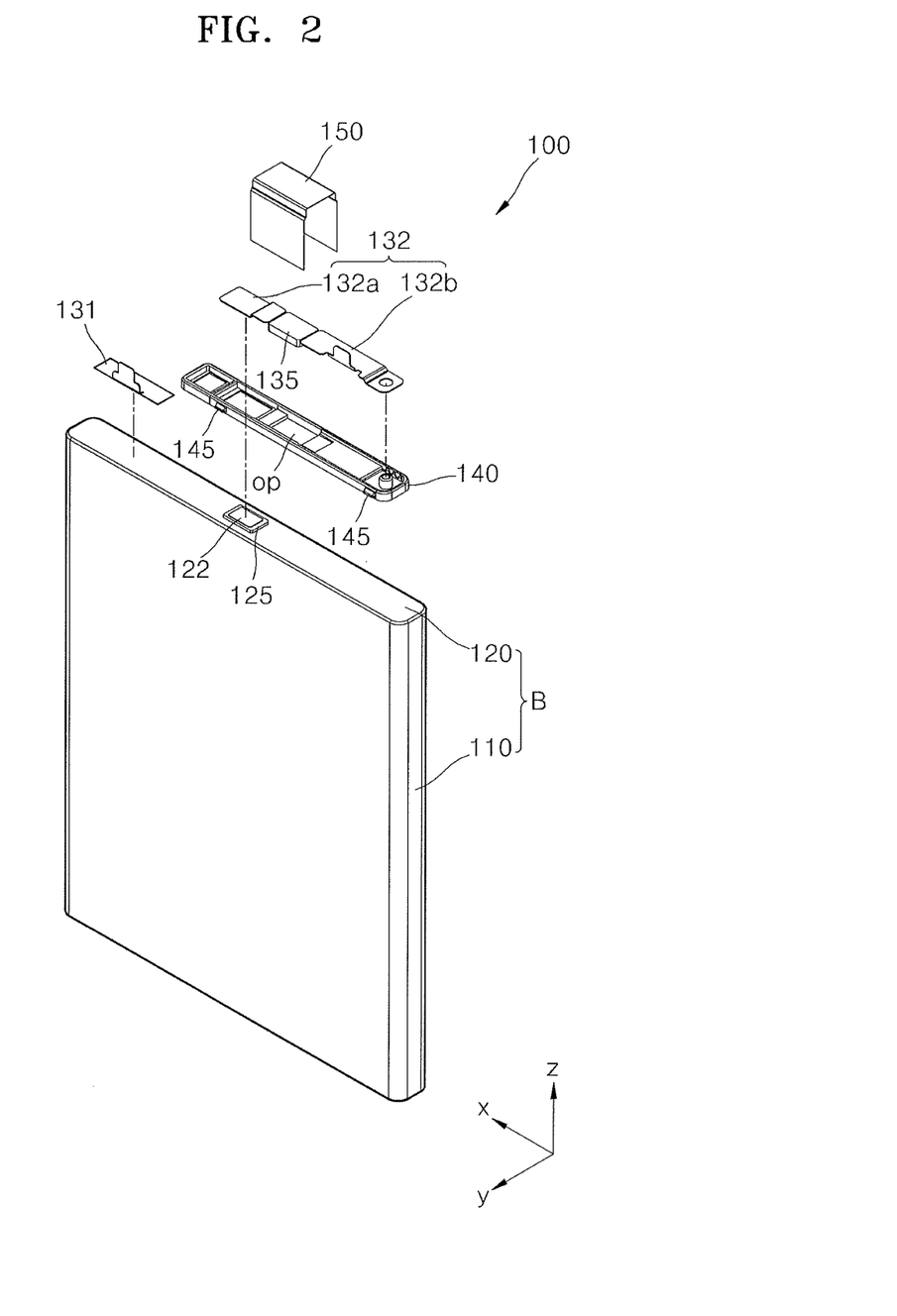
FIG. 2 illustrates an exploded perspective view of one of a plurality of battery units illustrated in FIG. 1.
Figure 3:
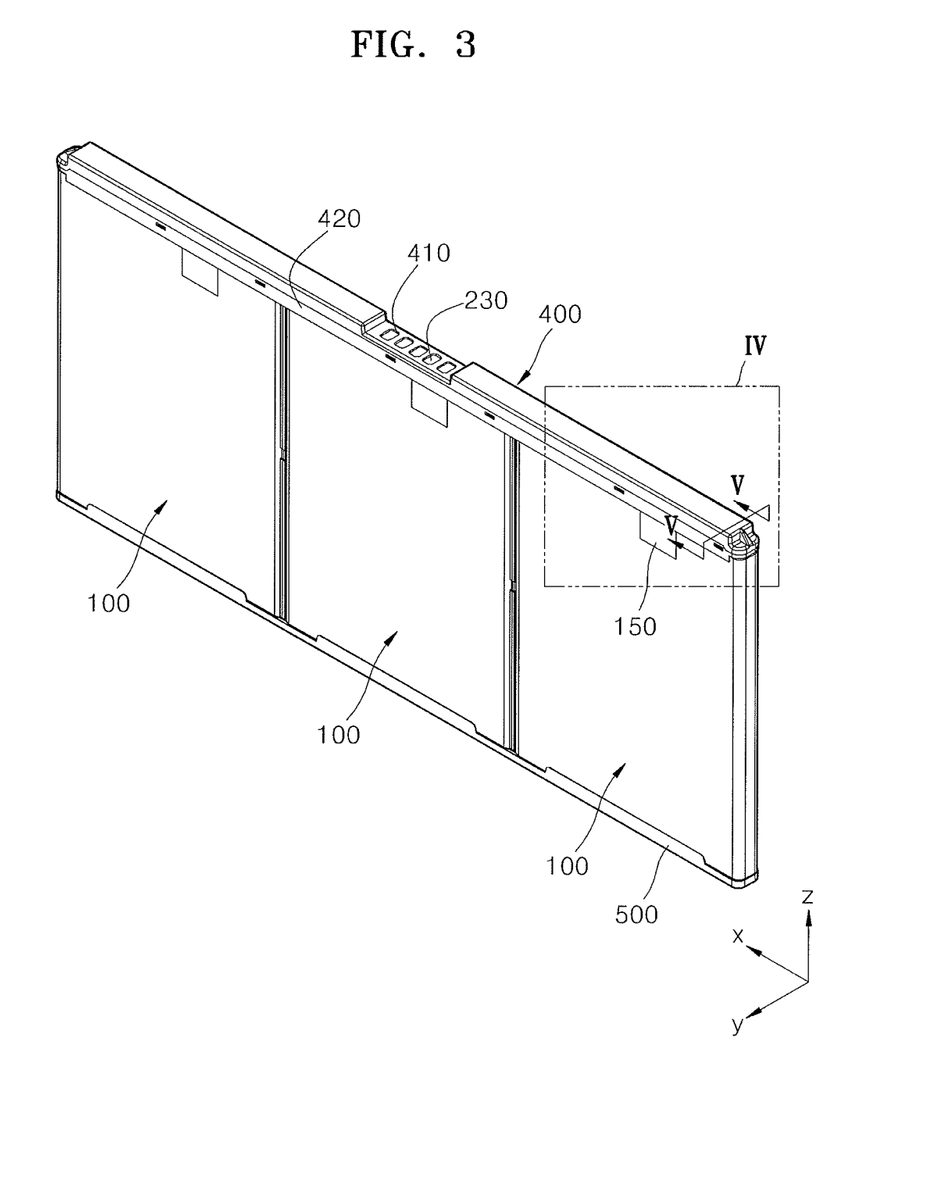
FIG. 3 illustrates a perspective view depicting a state in which battery units, a protective circuit module, an upper cover, and a lower cover illustrated in FIG. 1 are assembled.

FIG. 1 is a schematic perspective view of a battery pack according to an embodiment, FIG. 2 is an perspective view of one of a plurality of battery units and a holder illustrated in FIG. 1, and FIG. 3 is a perspective view illustrating a state in which a plurality of battery units 100, a protective circuit module 200, an upper cover 400, and a lower cover 500 are assembled. In FIG. 3, a label 600 and an insulating film 700 are omitted in FIG. 3 for convenience of explanation.

Referring to FIGS. 1 through 3, the battery pack according to the current embodiment may include the plurality of battery units 100, the protective circuit module 200, which is electrically connected to each of the plurality of battery units 100, a spacer 300 that electrically insulates the battery units 100 from each other, the upper cover 400, the lower cover 500, the label 600, and the insulating film 700.

The plurality of battery units 100 may be disposed side by side along a first direction (x-direction). For example, the plurality of battery units 100 may be disposed side by side so that their top surfaces are in the same direction. Sides of adjacent battery units 100 may face each other. Each of the battery units 100 may be a lithium-ion battery, that is, a secondary battery that may be recharged.

Referring to FIG. 2, each of the battery units 100 may include a bare cell B and a holder 140 fixed to an upper portion of the bare cell B.

The bare cell B may include a can 110 having an opening formed therein, an electrode assembly accommodated in the can 110 through the opening, a cap plate 120 that seals the opening of the can 110, and an electrode pin 122 formed on the cap plate 120.

The can 110 may have an opened, approximately hexahedral top surface and may be manufactured of a metallic material so as have a suitable resistance. For example, the can 110 may be manufactured of aluminum (Al) or an Al alloy. After the electrode assembly is inserted into the can 110 through the opening, the opening may be sealed by the cap plate 120. Like the can 110, the cap plate 120 may be manufactured of a metallic material, such as aluminum or an Al alloy. Portions at which the cap plate 120 and the can 110 contact each other may be combined with each other through laser welding so that an internal air-tight state of the bare cell B may be maintained.

The electrode assembly may include a first electrode plate and a second electrode plate onto which an electrode active material is coated, and a separator interposed therebetween. The first electrode plate and the second electrode plate may have different polarities. The electrode assembly may be manufactured in such a way that the first electrode plate, the separator, and the second electrode plate may be sequentially stacked on the electrode assembly and then be wound in a jelly roll shape. In other implementations, the electrode assembly may be a stack structure where the first electrode plate, the separator, and the second electrode plate are sequentially stacked.

The electrode pin 122 may be formed on the cap plate 120. The first electrode plate may be electrically connected to the cap plate 120, and the second electrode plate may be electrically connected to the electrode pin 122. The first electrode plate and the second electrode plate may have different polarities. Accordingly, the electrode pin 122 and the cap plate 120 may have different polarities. For example, the electrode pin 122 may have a negative electrode polarity, and the cap plate 120 may have a positive electrode polarity. A gasket 125 may be provided between the electrode pin 122 and the cap plate 120 so as to prevent a short circuit between the electrode pin 122 and the cap plate 120. The gasket 125 may be manufactured of an insulating material and may prevent an electrical short circuit between the electrode pin 122 and the cap plate 120.

The battery unit 100 may include first and second electrode tabs 131 and 132. The first and second electrode tabs 131 and 132 may serve as a positive electrode terminal and a negative electrode terminal of a secondary battery.

For example, the first electrode tab 131 may be disposed on the cap plate 120 and may be electrically connected to the cap plate 120. When the cap plate 120 has a positive electrode polarity, the first electrode tab 131 welded onto the cap plate 120 may also have a positive electrode polarity.

The second electrode tab 132 may be connected to the electrode pin 122 and a temperature-sensing element 135, such as a temperature cutoff (TCO). For example, the second electrode tab 132 may include a first portion 132a and a second portion 132b. One end of the first portion 132a may be connected to the electrode pin 122, and the other end of the first portion 132a may be connected to the temperature-sensing element 135. One end of the second portion 132b may be connected to the temperature-sensing element 135 so that the second electrode tab 132 including the temperature-sensing element 135 may be electrically connected to the electrode pin 122.

The first and second electrode tabs 131 and 132 may be disposed on the cap plate 120. Since the cap plate 120 has a positive electrode polarity, as described above, an electrical short circuit between the cap plate 120 and the second electrode tab 132 having a negative electrode polarity could occur easily. Thus, the second electrode tab 132 may be disposed on the holder 140 put on the cap plate 120.

The holder 140 may accommodate the second electrode tab 132 and the temperature-sensing element. The holder 140 may include an opening op formed in a position corresponding to a position of the temperature-sensing element 135 so as to sensitively react to a change in temperature of the battery unit 100.

The holder 140 may be fixed onto the battery unit 100 using a fixing member, such as a tape 150, while accommodating the second electrode tab 132 and the temperature-sensing element 135.

The holder 140 may include a protrusion 145. The protrusion 145 may extend and protrude from the holder 140 along a thickness direction (y-direction) of the battery unit 100 and may be combined with a hole 405 formed in the upper cover 400 that will be described below. For example, the protrusion 145 of the holder 140 may be combined with the hole 405 of the upper cover 400 through interference fit.

In the current embodiment, the protrusion 145 is formed on the holder 140, and the hole 405 is formed in the upper cover 400. In other implementations, a hole may be formed in the holder 140, and a protrusion may be formed on the upper cover 400 so that the protrusion and the hole may be combined with each other through an interference fit. Considering the overall thickness of the battery pack, for example, the protrusion 145 may be formed on the holder 140 and the hole 405 may be formed in the upper cover 400, such that the thickness of the battery pack may be reduced.

Referring back to FIGS. 1 through 3, the protective circuit module 200 may be disposed on a top surface of each battery unit 100, for example, on the cap plate 120, and may be electrically connected to the battery unit 100 such that charging/discharging of the battery unit 100 may be controlled. The protective circuit module 200 may prevent overheating and explosion that occur due to overcharging, overdischarging, or overcurrent of the battery unit 100.

The protective circuit module 200 may include circuit boards 210, protective elements 220 mounted on the circuit boards 210, and external terminals 230. The circuit boards 210 may extend long along an arrangement direction of the plurality of battery units 100. The protective elements 220 may be one selected from the group of safety elements including passive elements, such as resistors and capacitors of the circuit boards 210, or active elements, such as field effect transistors (FETs), or integrated circuits (ICs).

Each of the circuit boards 210 may include a connection hole 241. The first and second electrode tabs 131 and 132 provided on each of the battery units 100 may be inserted into the connection hole 241 formed in each circuit board 210. The first and second electrode tabs 131, 132 and the respective circuit board 210 may be soldered together. Patterns through which the battery units 100 may be connected in series and/or in parallel, may be formed on the circuit board 210. The first and second electrode tabs 131 and 132 of each battery unit 100 may be directly connected to the connection hole 241 formed in the circuit board 210 such that the plurality of battery units 100 may be charge/discharge-controlled according to driving of the protective element 220 and simultaneously may be connected in series and/or in parallel.

The spacer 300 may be interposed between adjacent battery units 100. One end of the spacer 300 may extend toward the protective circuit module 200 so as to support the protective circuit module 200. For example, the spacer 300 may include a first portion 310 interposed between the adjacent battery units 100, and a second portion 320 that extends from the first portion 310 to the protective circuit module 200.

The first portion 310 of the spacer 300 may electrically insulate the adjacent battery units 100 from each other. As described above with reference to FIG. 2, the can 110 and the cap plate 120 of the battery unit 100 may be manufactured of a metallic material, and the can 110 may be welded to the cap plate 120 such that the can 110 may have the same polarity as that of the cap plate 120. When the battery units 100 are disposed side by side, as illustrated in FIG. 1, an undesired electrical connection between the adjacent battery units 100 could be formed. According to an embodiment, the first portion 310 of the spacer 300 may be interposed between the adjacent battery units 100. Accordingly, an undesired electrical connection between the adjacent battery units 100 may be prevented.

The second portion 320 of the spacer 300 may be interposed in a space (or a gap) between the protective circuit module 200 and the battery unit 100 and may support the protective circuit module 200. The battery unit 100 may include the electrode pin 122 that protrudes upward and the holder 140 may be interposed on the battery unit 100. Accordingly, a space may be formed between the top surface of the battery unit 100 and a bottom surface of the protective circuit module 200. When the second portion 320 of the spacer 300 is interposed in the space, the protective circuit module 200 may be supported and simultaneously may be protected from an external force applied to the protective circuit module 200.

The upper cover 400 may be disposed on the protective circuit module 200. The upper cover 400 may include an opening 410 through which the external terminal 230 formed on the protective circuit module 200 is exposed.

The upper cover 400 may have a length that is substantially the same as the entire length of the plurality of battery units 100 disposed side by side along the first direction. The upper cover 400 may be combined with the battery units 100 such that the protective circuit module 200 may be interposed between the battery units 100. For example, the upper cover 400 and the holder 140 provided at each of the battery units 100 may be combined with each other through an interference fit, as described above.

The lower cover 500 may be disposed at an opposite side to a side at which the upper cover 400 is disposed, so as to face the upper cover 400. The upper cover 400 may be disposed to cover the top surface of each battery unit 100, with the protective circuit module 200 being interposed between the battery units 100. The lower cover 500 may be disposed to cover the bottom surface of each battery unit 100.

The label 600 may be disposed to surround sides of each battery unit 100. For example, the label 600 may be attached to the sides of the battery unit 100. An insulating film 700 may be interposed between the label 600 and the sides of the battery unit 100.

Portions of the label 600 may be attached to the upper cover 400 and the lower cover 500. To this end, skirt portions 420 and 520 may be provided at the upper cover 400 and the lower cover 500 and may extend toward the battery unit 100. The portions of the label 600 may be attached onto the skirt portions 420 and 520 such that the upper cover 400, the lower cover 500, and the label 600 may be insulated from the battery unit 100 and simultaneously, such that the battery unit 100 may be prevented from being exposed to the outside.

Hereinafter, a combination of the upper cover 400 and the battery unit 100, for example, a combination of the upper cover 400 and the holder 140 of the battery unit 100 will be descried with reference to FIGS. 4 and 5.

Figure 4:
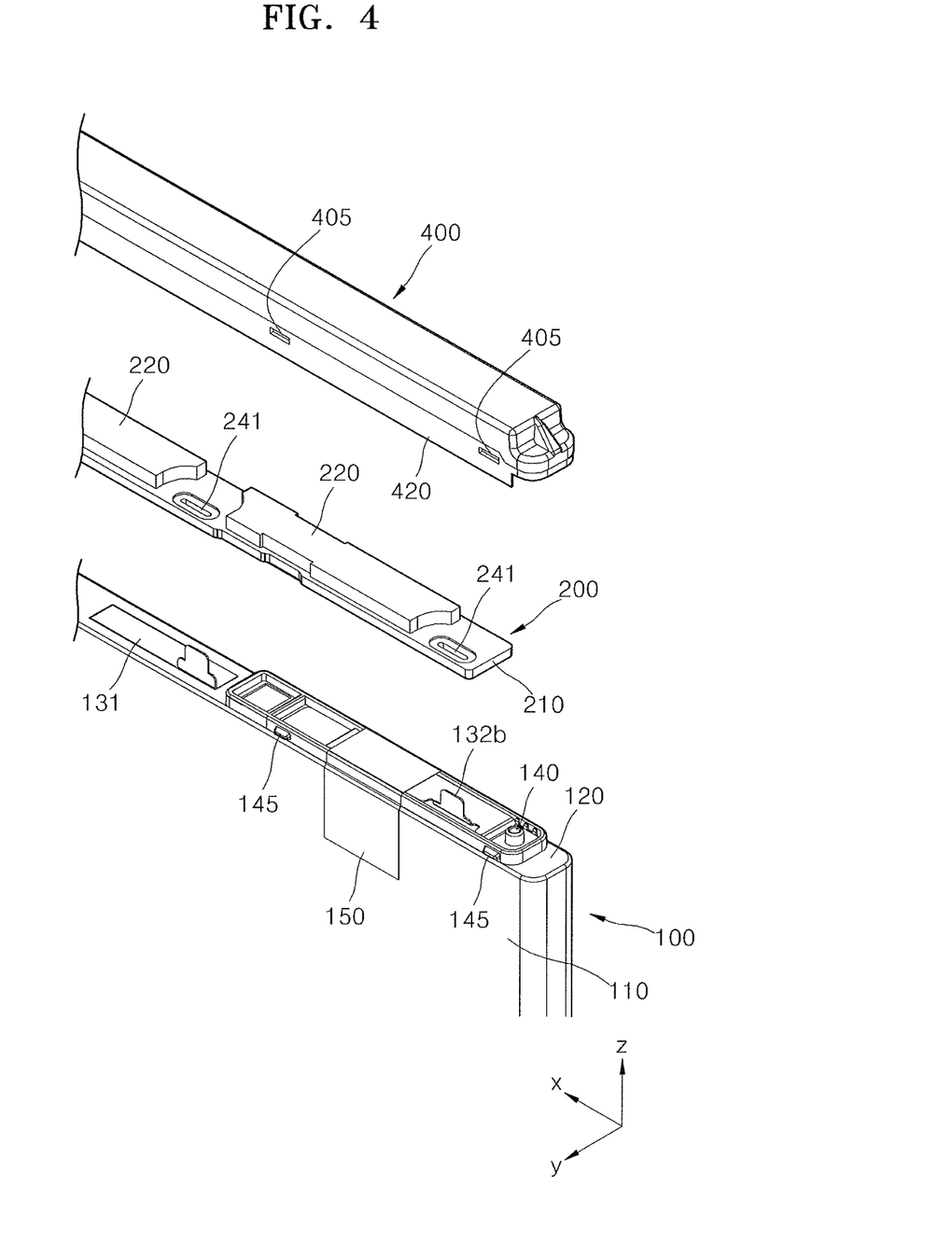
FIG. 4 illustrates an exploded perspective view of a portion IV of FIG. 3.
Figure 5:
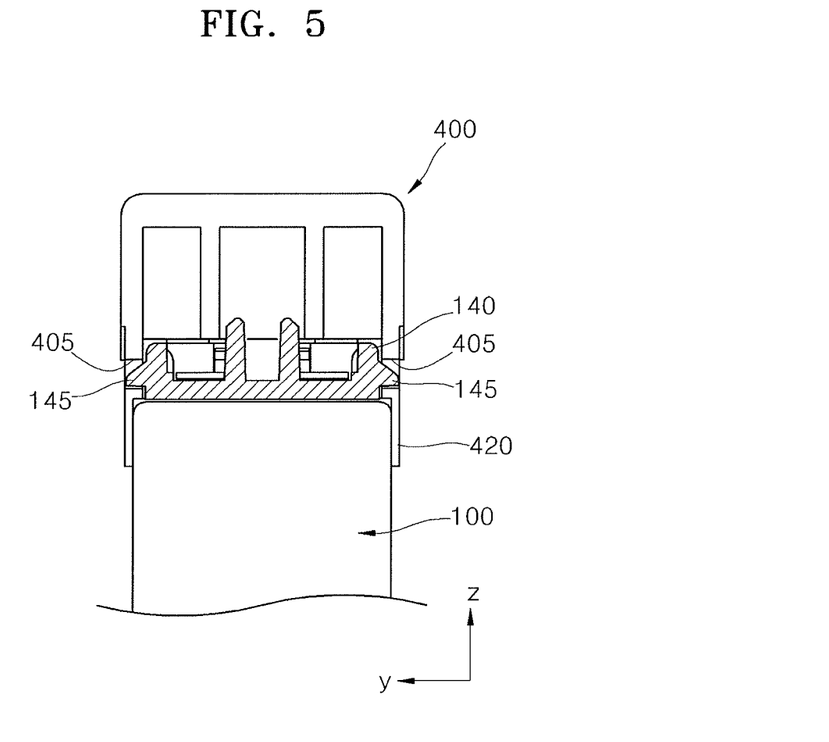
FIG. 5 illustrates a cross-sectional view taken along a line V-V of FIG. 3.

FIG. 4 is an partial exploded perspective view of a portion IV of FIG. 3, and FIG. 5 is a cross-sectional view taken along a line V-V of FIG. 3.

Referring to FIGS. 4 and 5, the protective circuit module 200 may be disposed on the battery unit 100, and the upper cover 400 may be disposed on the protective circuit module 200. The protective circuit module 200 may be placed on the cap plate 120 on which the electrode pin 122 is formed. The first and second electrode tabs 131 and 132 included in each battery unit 100 may be inserted into the connection holes 241 formed in the protective circuit module 200 and then the first and second electrode tabs 131 and 132 and the protective circuit module may be soldered together. Thus, the first and second electrode tabs 131 and 132 may be electrically connected to the protective circuit module 200.

The upper cover 400 may be combined with the battery unit 100 such that the protective circuit module 200 is interposed between the battery unit 100 and the upper cover 400. For example, the upper cover 400 may include the hole 405, and the holder 140 of the battery unit 100 may include the protrusion 145. The protrusion 145 may be combined with the hole 405 through an interference fit such that the upper cover 400 and the holder 140 are combined with each other. The protrusion 145 may extend and protrude from the battery unit 100 along the thickness direction (y-direction) of the battery unit 100 and thus may be combinable with the hole 405 of the upper cover 400.

As described above, according to the one or more of the above embodiments provide a compact battery pack having improved assembling characteristics may be provided.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope as set forth in the following claims.

What is claimed is:

1. A battery pack, comprising:
   a plurality of battery units;
   a protective circuit module on each of the plurality of battery units, the protective circuit module being electrically connected to each of the plurality of battery units; and
   an upper cover on the protective circuit module,
   wherein each of the battery units includes:
     a bare cell including a can having an opening, an electrode assembly in the can, the electrode assembly including a first electrode plate, a second electrode plate, and a separator between the first electrode plate and the second electrode plate, and a cap plate that seals the opening of the can; and
     a holder between the bare cell and the protective circuit module,
   wherein the bare cells are located side by side along a first direction such that each cap plate is exposed along the same direction, and
   wherein one of the holder and the upper cover includes a protrusion that protrudes in a second direction, and other one of the holder and the upper cover includes a hole combined with the protrusion.

2. The battery pack as claimed in claim 1, wherein at least one holder is on each bare cell.

3. The battery pack as claimed in claim 2, wherein the holder is fixed onto the cap plate of the bare cell.

4. The battery pack as claimed in claim 1, wherein each of the plurality of battery units includes an electrode pin that protrudes toward the protective circuit module.

5. The battery pack as claimed in claim 4, wherein the holder accommodates a temperature-sensing element that is electrically connected to the electrode pin.

6. The battery pack as claimed in claim 1, further comprising:
   a lower cover at an opposite side to a side on which the upper cover is disposed, the lower cover facing the upper cover; and
   a label that is attached to portions of the upper cover and the lower cover and that surrounds sides of each of the battery units.

7. The battery pack as claimed in claim 6, further comprising an insulating film between the label and sides of each of the battery units.

8. The battery pack as claimed in claim 6, wherein a length of the upper cover is substantially the same as a whole length of the battery units along the first direction.

9. The battery pack as claimed in claim 8, wherein the upper cover includes a cover opening through which an external terminal formed on the protective circuit module is exposed.

10. The battery pack as claimed in claim 1, wherein:
    the second direction is a thickness direction of the battery units,
    the protrusion is formed on the holder, and
    the hole is formed in the upper cover.

11. A battery pack, comprising:
    a plurality of battery units;
    a protective circuit module on a top surface of each of the plurality of battery units, the protective circuit being electrically connected to each of the plurality of the battery units; and
    an upper cover on the protective circuit module,
    wherein each of the plurality of the battery units includes:
      a bare cell including a top surface having a first polarity, and an electrode pin that has a second polarity that is different from the first polarity, the electrode pin protruding from the top surface; and
      a holder under the protective circuit module and on the top surface of the bare cell,
    wherein the holder of each of the plurality of battery units and the upper cover are combined with each other through an interference fit.

12. The battery pack as claimed in claim 11, wherein:
    each holder includes a protrusion, and
    the upper cover includes a hole that is combined with the protrusion through an interference fit.

13. The battery pack as claimed in claim 12, wherein the protrusion extends along a thickness direction of each of the battery units.

14. The battery pack as claimed in claim 11, wherein each holder is fixed onto the top surface of the bare cell.

15. The battery pack as claimed in claim 14, wherein each holder accommodates a temperature-sensing element that is electrically connected to the electrode pin.

16. The battery pack as claimed in claim 11, further comprising a label that surrounds sides of each of the battery units.

17. The battery pack as claimed in claim 16, further comprising a lower cover at an opposite side to a side at which the upper cover is disposed, the lower cover facing the upper cover,
    wherein portions of the label are attached to portions of the upper cover and the lower cover.

18. The battery pack as claimed in claim 16, further comprising an insulating film between the label and sides of each of the battery units.

19. The battery pack as claimed in claim 12, wherein the bare cell further comprises:
    a can having an opening formed therein;
    an electrode assembly accommodated in the can through the opening, the electrode assembly including a first electrode plate having a first polarity, a second electrode plate having a second polarity, and a separator between the first and second electrode plates; and
    a cap plate that seals the opening and forms the top surface,
    wherein the electrode pin extends upwardly from the cap plate.

20. The battery pack as claimed in claim 11, wherein the battery units are located side by side along a first direction, and a length of the upper cover is substantially the same as an entire length of the battery units along the first direction.

* * * * *